United States Patent
Lee

(10) Patent No.: US 6,275,537 B1
(45) Date of Patent: Aug. 14, 2001

(54) AUDIO AND VIDEO MULTIPLEXED TRANSMISSION SYSTEM

(75) Inventor: Sang-jin Lee, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/090,219

(22) Filed: Jun. 4, 1998

(30) Foreign Application Priority Data

Jun. 4, 1997 (KR) .................................................. 97-23122

(51) Int. Cl.$^7$ ................................. H04N 7/12; H04N 7/04
(52) U.S. Cl. ................................. 375/240.28; 348/423.1; 348/512
(58) Field of Search .................. 375/240.01, 240.25, 375/240.26, 240.28; 348/423.1, 425.1, 425.4, 512, 515–516, 518, 462, 484; 386/96, 98–99, 104, 109, 112

(56) References Cited

U.S. PATENT DOCUMENTS

| | | | |
|---|---|---|---|
| 4,544,950 | * 10/1985 | Tu | 348/485 |
| 5,231,492 | 7/1993 | Dangi et al. | 375/240.23 |
| 5,287,182 | * 2/1994 | Haskell et al. | 348/500 |
| 5,619,197 | * 4/1997 | Nakamura | 341/50 |
| 5,619,337 | * 4/1997 | Naimpally | 386/83 |
| 5,621,772 | 4/1997 | Maturi et al. | 375/366 |
| 5,751,356 | 5/1998 | Suzuki | 348/390.1 |
| 5,815,634 | * 9/1998 | Daum et al. | 386/96 |

OTHER PUBLICATIONS

Chao et al., "A packet video/audio system using the asynchronous transfer mode technique", IEEE Transactions on Consumer Electronics, vol. 35, iss. 2, pp. 97–105, May 1989.*

* cited by examiner

*Primary Examiner*—Vu Le
(74) *Attorney, Agent, or Firm*—Robert E. Bushnell, Esq.

(57) ABSTRACT

An audio and video multiplexed transmission and/or reception system is provided, in which audio and video information are digitized, coded, multiplexed, and transmitted, and the transmitted audio and video information is demultiplexed, decoded, and converted into analog signals. The audio and video multiplexed transmission and reception system includes a coding controller for providing time control data to an audio encoder and a video encoder, and a timer for outputting time data to an audio analog-to-digital converter, a video analog-to-digital converter and the coding controller. Also, the audio and video multiplexed transmission and reception system includes an encapsulator for converting a data stream, including multiplexed video and audio signals, into a data frame, and a decapsulator for converting the data frame into a data stream. Therefore, audio and video information are digitized periodically with a predetermined period, and coded by a time slice coding method for transmission, thereby effectively synchronizing the audio and video information. Also, period information can be automatically controlled according to the transmission channels, so that the time difference created between the transmitter and a receiver can be controlled properly. The data stream includes a transport header, tick information transmitting clock frequency information, a T-header and coded audio and video information.

14 Claims, 3 Drawing Sheets

AUDIO AND VIDEO MULTIPLEXED TRANSMISSION SYSTEM

CLAIM OF PRIORITY

This application makes reference to, incorporates the same herein, and claims all benefits accruing under 35 U.S.C §119 from an application entitled Audio And Video Multiplexed Transmission System earlier filed in the Korean Industrial Property Office on Jun. 4, 1997, and there duly assigned Ser. No. 97-23122 by that Office.

BACKGROUND OF THE INVENTION

1. Field of the Invention

The present invention relates to an audio and video multiplexed transmission system, and more particularly, to a multiplexed transmitter and/or receiver for transmitting and/or receiving audio and video information by effectively coding and/or decoding the audio and video information and performing a multiplexing and/or demultiplexing according to the transmission rate of a communication channel which is a limited transmission medium.

2. Background Art

Recently, an apparatus for simultaneously transmitting audio and video information for communication, such as a video conference system and a videophone, has been developed. In the multiplexed transmission system, a technique is required for coding/decoding information with high efficiency while maintaining balance of the audio and video information. In detail, coded video information occupies a greater amount of data compared to coded audio information. Thus, when transmitting audio and video information at the same time, the transmission rate at a communication channel is limited, and coding and decoding times become different, so that it is difficult to synchronize the audio and video information.

To solve this problem, a method using two transmission channels is used: one for video information, and the other for audio information. However, two transmission channels are required. Also, there is a method using one transmission channel. However, according to the method using one transmission channel, extra logic is required in a transmitter for calculating the delay time of the video information, and logic is required in a receiver for delaying the audio information by as much as the delay time of the video information. Also, there is a method for simultaneously transmitting lip-sync information, based on the MPEG-2 standard for the synchronization of the video and audio information. However, it is difficult to implement hardware for the method for transmitting the lip-sync information, and impossible if the transmission speed of a transmission medium is slow. MPEG is a compressed audio/video signal protocol established by the Moving Pictures Experts Group of the International Standardization Organization. An example of a MPEG coding system is provided in U.S. Pat. No. 5,751,356 to Hiroshi Suzuki entitled Video/Audio Signal Coding System. Additionally, an example of a MPEG decoding system is provided in U.S. Pat. No. 5,621,772 to Greg Maturi et al. entitled Hysteretic Synchronization System ForMPEGAudio Frame Decoder.

A further example of the prior art, which is related to the present invention, is U.S. Pat. No. 5,231,492 to Ryoichi Dangi et al. and entitled Video And Audio Multiplex Transmission System. The U.S. Pat. No. 5,231,492 patent discloses a multiplexed transmission system for audio and video information which is capable of providing optimum quality video and audio information. However, extra coding/decoding of the video and audio information is performed under the control of a controller, so that it is difficult to overcome a time delay between the video and audio information. Thus, it is difficult to achieve exact synchronization between the video and audio information. Also, due to the difference in transmission rates between the video and audio information, it is also difficult to achieve an effective transmission while conforming to a channel transmission rate.

SUMMARY OF THE INVENTION

To solve the above problems, it is an object of the present invention to provide an audio and video multiplexed transmitter capable of providing exact synchronization between video and audio information by coding the video and audio information periodically according to a predetermined clock frequency.

It is another object of the present invention to provide an audio and video multiplexed receiver capable of providing exact synchronization between video and audio information by decoding the video and audio information periodically according to a predetermined clock frequency.

It is still another object of the present invention to provide an audio and video multiplexed transceiver capable of providing exact synchronization between video and audio information, by coding the video and audio information periodically according to a predetermined clock frequency for transmission, and decoding the transmitted video and audio information periodically according to a predetermined clock frequency for reception.

To achieve the first object, there is provided an audio and video multiplexed transmitter for coding and then transmitting audio and video information, comprising: an audio analog-to-digital (A/D) converter for converting an audio signal into a digital audio signal periodically according to a predetermined clock frequency; an audio encoder for coding the digital audio signal; a video A/D converter for converting a video signal into a digital video signal periodically according to a predetermined clock frequency; a video encoder for coding the digital video signal; a coding controller for providing control data corresponding to the predetermined clock frequency to the audio encoder and the video encoder; a timer for outputting time data representing the predetermined clock frequency to the audio A/D converter, the video A/D converter and the coding controller; and a multiplexer for multiplexing the coded audio and video signals, according to the control data of the coding controller, to output a data stream.

Preferably, the audio and video multiplexed transmitter further comprises an encapsulator for converting the data stream continuously output by the multiplexer into a data frame, according to the characteristics of a transmission medium.

To achieve the second object, there is provided an audio and video multiplexed receiver for receiving coded audio and video information for demultiplexing and decoding, comprising: a demultiplexer for demultiplexing a received data stream to separate digital audio and video signals; an audio decoder for decoding the digital audio signal; a video decoder for decoding the digital video signal; an audio digital-to-analog (D/A) converter for converting the decoded digital audio signal into an analog audio signal periodically according to a predetermined clock frequency; a video D/A converter for converting the decoded digital video signal into an analog video signal periodically according to a predetermined clock frequency; a decoding controller for providing control data, corresponding to the predetermined clock frequency, to the audio decoder and the video decoder; and a timer for outputting time data representing the predetermined clock frequency to the audio D/A converter, the video DIA converter and the decoding controller.

Preferably, the audio and video multiplexed receiver further comprises a decapsulator for converting a data frame, transmitted from an encapsulator of a transmitter or a transmission medium, into a data stream, according to the characteristics of the transmission medium.

To achieve the third object, there is provided an audio and video multiplexed transmission system for coding then transmitting audio and video information through a coding, and receiving the coded audio and video information for decoding, comprising: a transmitter; and a receiver, wherein the transmitter includes: an audio analog-to-digital (A/D) converter for converting an audio signal into a digital audio signal periodically according to a predetermined clock frequency; an audio encoder for coding the digital audio signal; a video A/D converter for converting a video signal into a digital video signal periodically according to a predetermined clock frequency; a video encoder for coding the digital video signal; a coding controller for providing control data corresponding to the predetermined clock frequency to the audio encoder and the video encoder; a timer for providing time data representing the predetermined clock frequency to the audio A/D converter, the video A/D converter and the coding controller; and a multiplexer for multiplexing the coded audio and video signals according to the control data from the coding controller to output a data stream, and the receiver includes: a demultiplexer for demultiplexing the input data stream to separate digital audio and video signals; an audio decoder for decoding the digital audio signal; an audio digital-to-analog (D/A) converter for converting the decoded audio signal into an analog audio signal periodically according to a predetermined clock frequency; a video decoder for decoding the digital video signal; a video D/A converter for converting the decoded video signal into an analog video signal periodically according to a predetermined clock frequency; a decoding controller for providing control data corresponding to the predetermined clock frequency to the audio decoder and the video decoder; and a timer for outputting time data representing the predetermined clock frequency to the audio D/A converter, the video D/A converter and the decoding controller.

Preferably, the audio and video multiplexed transceiver further comprises: an encapsulator for converting the data stream continuously output by the multiplexer to a data frame, according to the characteristics of a transmission medium; and a decapsulator for converting the data frame input from the encapsulator or a transmission medium into a data stream, according to the characteristics of the transmission medium.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

Prior to a detailed description of preferred embodiments of the present invention with 18 reference to the attached drawings, a conventional audio and video multiplexed transmission system disclosed in U.S. Pat. No. 5,231,492 will be described with reference to FIGS. 1 and 2 in order to help understanding of the present invention.

Figure 1:
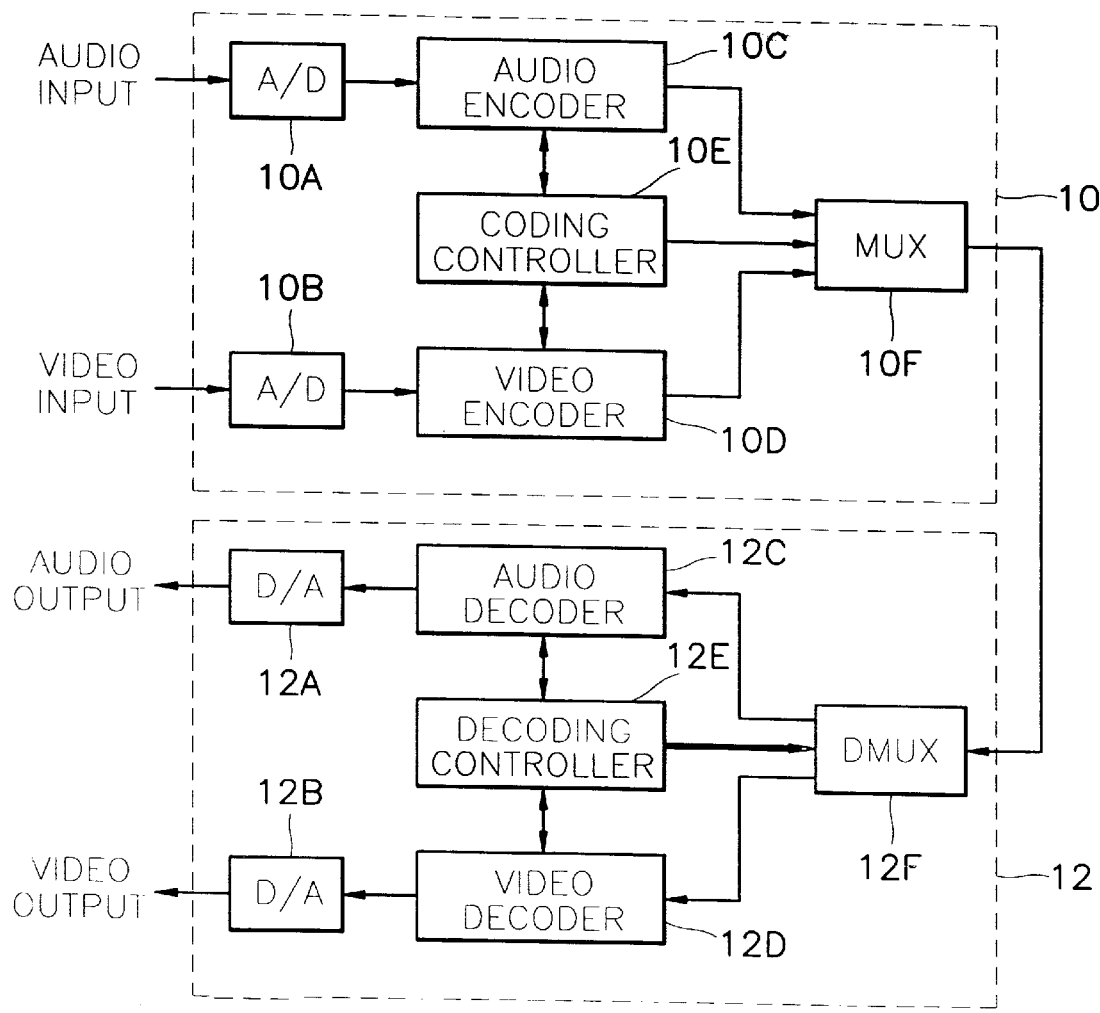
FIG. 1 is a block diagram of a conventional audio and video multiplexed transmission system.

In FIG. 1, the conventional audio and video multiplexed transmission system is roughly constituted of a transmitter 10 and a receiver 12. In the transmitter 10, audio and video inputs are digitized by analog-to-digital (A/D) converters 10A and 10B, respectively, and the digital audio and video signals are provided to an audio encoder 10C and a video encoder 10D, respectively, to be coded under the control of a coding controller 10E. Then, the coded audio and video information are multiplexed by a multiplexer (MUX) 10F, also under the control of the coding controller 10E. Then, the multiplexed information is transferred to the receiver 12 via a transmission medium (not shown), in a frame structure as shown in FIG. 2.

In the receiver 12, a demultiplexer (DMUX) 12F receives the data transmitted from the transmitter 10, to separate the transmitted audio and video information under the control of a decoding controller 12E. The separated audio and video information is provided to an audio decoder 12C and a video decoder 12D, which decode the audio and video information, respectively, under the control of the decoding controller 12E. Then, the decoded audio and video information is provided to digital-to-analog (D/A) converters 12A and 12B, respectively, thereby outputting analog audio and video information.

Figure 2:
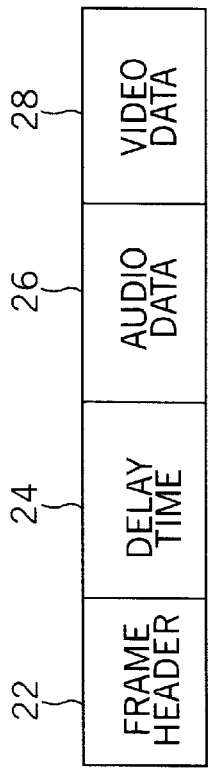
FIG. 2 is a diagram showing the structure of a frame used in the multiplexed transmission system of FIG. 1.

As shown in FIG. 2, according to the conventional audio and video transmission system, audio and video information is transmitted in a frame structure. A frame header 22 includes information of audio and video data, e.g., information of frame identification, frame length, frame alignment and checksum. A delay time 24 includes delay information for synchronizing the audio data 26 with the video data 28, which must be done since the amount of coded audio data 26 is relatively less than that of coded video data 28. Also, the frame header 22, the delay time 24, the audio data 26 and the video data 28 of the conventional data frame are arranged in sequence.

In order to include the delay time 24 in the data frame, a delay calculator, which is not illustrated in FIG. 1, is present in the coding controller 10E of the transmitter 10, to calculate a delay time based on the input and output data of the video encoder 10D and provide to the multiplexer 10F delay data based on the delay time and a previous delay time. In the same manner, the receiver 12 includes a delay compensator (not shown) between the demultiplexer 12F and the audio decoder 12C, for compensating for the delay between the audio and video signals, by delaying the audio data by as much as the delay time of the video data in the transmission. However, it is difficult to overcome the fundamental delay time between the audio and video information, thus causing difficulty in the exact synchronization of the video and audio information. Also, it is difficult to effectively transmit the video and audio information while conforming to a channel transmission rate, due to the difference of transmission rate between the video and audio information.

Figure 3:
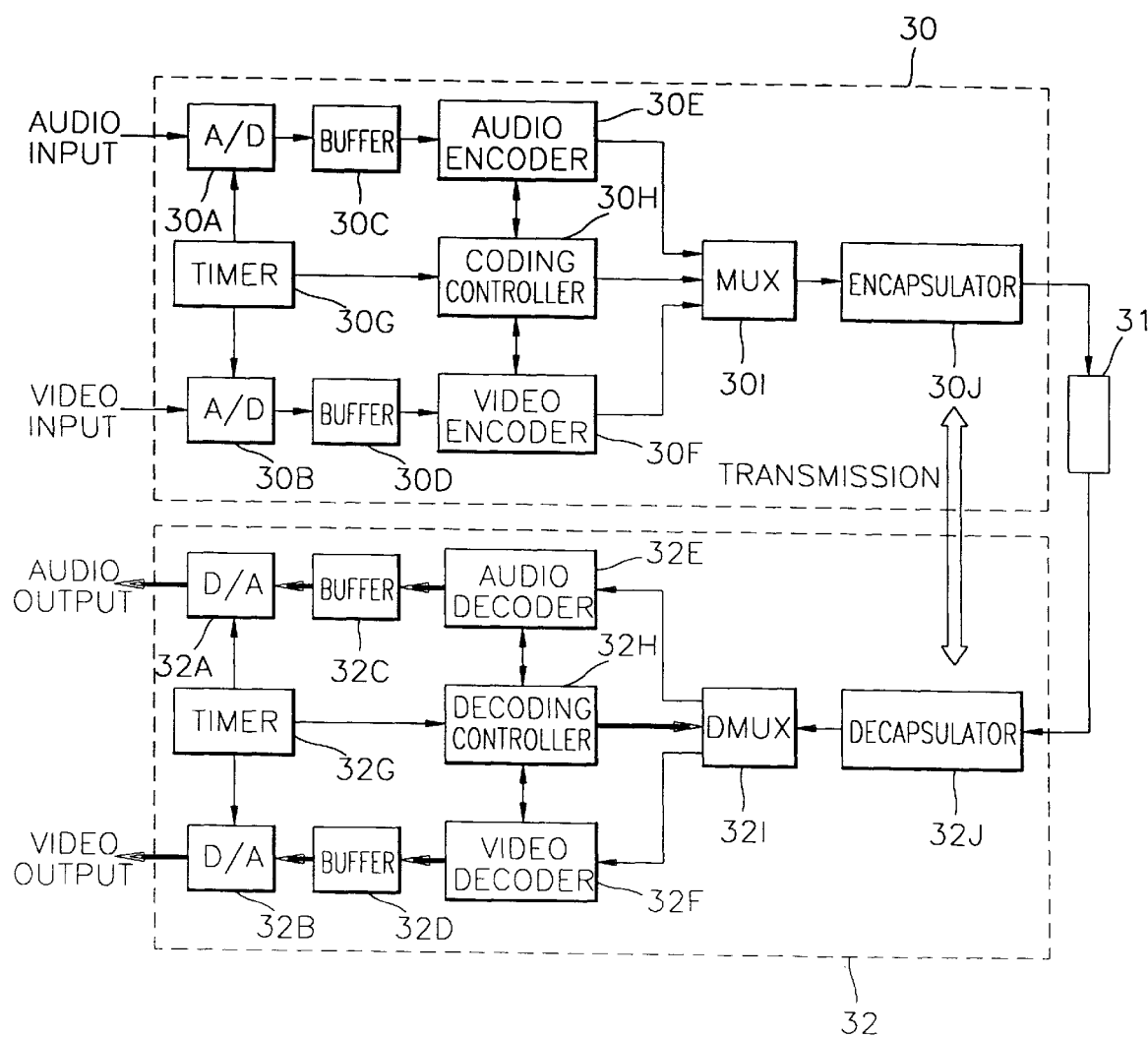
FIG. 3 is a block diagram of an audio and video multiplexed transmission system according to the present invention.

In order to overcome the above defects of the conventional audio and video multiplexed transmission system, an audio and video multiplexed transmission system according to the present invention includes a timer required for transmitting and outputting the audio and video data periodically according to a predetermined clock frequency, which will be described in detail with reference to FIGS. 3 through 5.

In an audio and video multiplexed transmitter 30 of the present invention, an audio analog-to-digital (A/D) converter 30A converts an analog audio signal into a digital audio signal periodically according to a predetermined clock frequency, to store the digital audio signal in a buffer 30C. An audio encoder 30E codes the digital audio signal output from the buffer 30C. A video A/D converter 30B converts an analog video signal into a digital video signal periodically according to the predetermined clock frequency to store the digital video signal in a buffer 30D. A video encoder 30F codes the digital video signal output from the buffer 30D. Here, a coding controller 30H provides control data to the audio encoder 30E and the video encoder 30F periodically according to the predetermined clock frequency, and a timer 30G outputs time data representing the predetermined clock frequency to the audio A/D converter 30A, the video A/D converter 30B and the coding controller 30H. A multiplexer 30I receives the coded audio and video signals output respectively from the audio encoder 30E and the video encoder 30F, to perform multiplexing according to control data from the coding controller 30H, thereby outputting a data stream of the structure shown in FIG. 4.

According to the present invention, the audio and video information are digitized periodically according to the time data, representing the predetermined clock frequency, provided from the timer 30G, and the control data from the coding controller 30H is generated based on the time data from the timer 30G in order to code the audio and video information. Accordingly, the audio and video data are exactly in sync.

Figure 4:
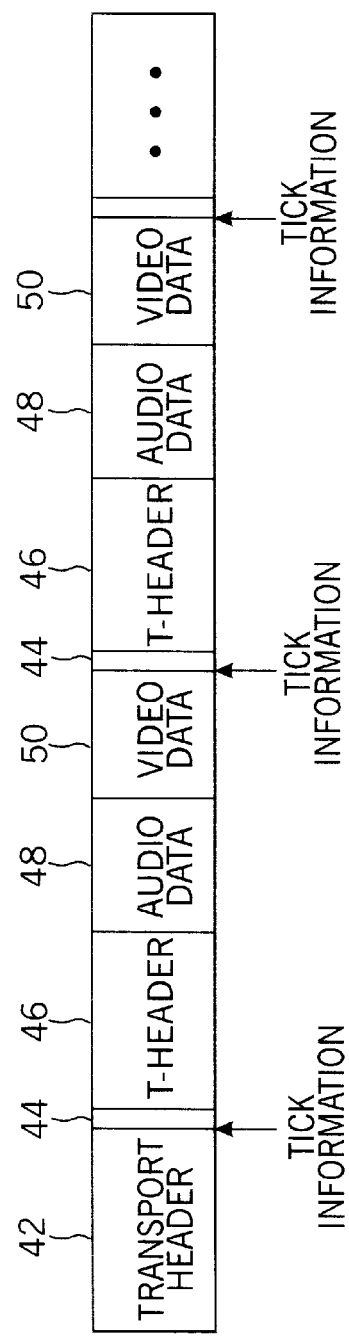
FIG. 4 is a diagram showing the structure of a data stream used in the multiplexed transmission system of FIG. 3.

In the data stream of FIG. 4, a transport header 42, located at the leading end, includes start information and period information and is provided in the data stream only in the initial multiplexing stage. Also, tick information 44 of a specific bit stream is included in the data stream, for transmitting the clock frequency information. Then, a T-header 46 follows the tick information 44, as header information of the audio and video information which are coded periodically according to a predetermined clock frequency. The T-header 46 includes data identification information, alignment and data length information, and end of stream data. The T-header 46 is followed by coded audio data 48 and coded video data 50. That is, the transport header 42 is included in the data stream only in the initial stage of the multiplexing, and then the tick information, T-header information, audio data and video data are repeated, periodically according to the predetermined clock frequency provided from the timer 30G.

Figure 5:
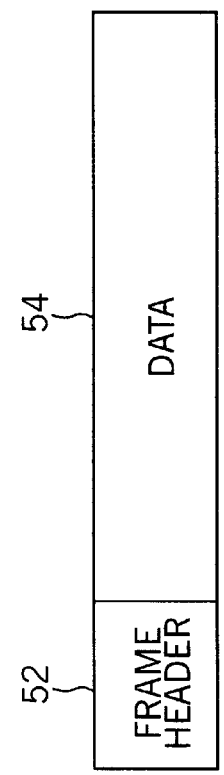
FIG. 5 is a diagram showing the structure of a frame used in the multiplexed transmission system of FIG. 3.

Also, preferably, the audio and video multiplexed transmitter 30 includes an encapsulator 30J for converting the data stream continuously output from the multiplexer 30I into a data frame of FIG. 5, according to the characteristics of a transmission medium. The encapsulator 30J makes the coding process independent of the transmission process hierarchically, thus minimizing the effect of the choice of transmission channel on the coding process. The data frame of FIG. 5 includes a frame header 52 as header information required for the transmission, and a data 54 which is the data stream of FIG. 4.

According to another embodiment of the present invention, an audio and video multiplexed receiver 32 includes a demultiplexer (DMUX) 32I for demultiplexing the input data stream from the multiplexer 31I of the transmitter 30 or a transmission medium 31, to separate the audio and video signals, an audio decoder 32E for decoding the digital audio signal, a video decoder 32F for decoding the digital video signal, an audio D/A converter 32A for converting the decoded audio signal into an analog audio signal periodically according to the predetermined clock frequency, a video D/A converter 32B for converting the decoded video signal into an analog video signal periodically according to the predetermined clock frequency, a decoding controller 32H for providing control data, corresponding to the predetermined clock frequency, to the audio decoder 32E and the video decoder 32F, and a timer 32G for providing time data representing the predetermined clock frequency to the audio D/A converter 32A, the video D/A converter 32B and the decoding controller 32H. In the receiver 32, buffers 32C and 32D for temporarily storing the decoded audio and video information may be placed between the audio decoder 32E and the audio D/A converter 32A, and between the video decoder 32F and the video D/A converter 32B, respectively.

Also, preferably, the audio and video receiver 32 includes a decapsulator 32J for receiving the data frame to convert into a data stream, according to the characteristics of the transmission medium 31. The operation of the audio and video multiplexed receiver 32 is the reverse of that of the audio and video multiplexed transmitter 30, so a detailed description of the operation of the audio and video multiplexed receiver 32 will be omitted. However, the receiver 32 demultiplexes the data stream output from the multiplexer 30I of the transmitter 30, or demultiplexes the data frame output from the encapsulator 30J of the transmitter 30, or the transmission medium 31 in order to process the audio and video information hierarchically, and then separates the audio and video information for decoding.

According to still another embodiment of the present invention, an audio and video multiplexed transceiver may be constituted of a transmitter 30 and a receiver 32. The transmitter 30 includes an audio A/D converter 30A for converting an audio signal into a digital audio signal periodically according to the predetermined clock frequency, an audio encoder 30E for coding the digital audio signal, a video A/D converter 30B for converting a video signal into a digital video signal periodically according to the predetermined clock frequency, a video encoder 30F for coding the digital video signal, a coding controller 30H for providing control data corresponding to the predetermined clock frequency to the audio encoder 30E and the video encoder 30F, a timer 30G for outputting time data representing the predetermined clock frequency to the audio A/D converter 30A, the video A/D converter 30B and the coding controller 30H, and a multiplexer 30I, for multiplexing the coded audio and video signals according to the control data from the coding controller 30H, to output a data stream. The receiver 32 includes a demultiplexer 32I for demultiplexing the data stream transmitted from the transmitter 30 to separate the audio and video signals, an audio decoder 32E for decoding the digital audio signal, a video decoder 32F for decoding the digital video signal, an audio D/A converter 32A for converting the decoded audio signal into an analog audio signal periodically according to the predetermined clock frequency, a video D/A converter 32B for converting the decoded video signal into an analog video signal periodically according to the predetermined clock frequency, a decoding controller 32H for providing control data corresponding to the predetermined clock frequency to the audio decoder 32E and the video decoder 32F, and a timer 32G for outputting time data representing the predetermined clock frequency to the audio D/A converter 32A, the video D/A converter 32B and the decoding controller 32H. In addition, the transmitter 32 may include buffers 30C and 30D for storing the digital audio and video information, between the audio A/D converter 30A and the audio encoder 30E, and between the audio A/D converter 30B and the video encoder 30F, respectively. Also, the receiver 32 may include buffers 32C and 32D for storing the decoded audio and video information, between the audio decoder 32E and the audio D/A converter 32A, and the video decoder 32F and the video D/A converter 32B, respectively.

Preferably, the audio and video multiplexed transceiver includes an encapsulator 30J for converting the data stream continuously input from the multiplexer 30I into a data frame according to the characteristics of a transmission medium, and a decapsulator 32J for converting the data frame input from the encapsulator 30J or a transmission medium 31 into a data stream according to the characteristics of the transmission medium.

As described above, according to the present invention, audio and video information are digitized periodically with a predetermine period, and coded by a time slice coding method for transmission, thereby effectively synchronizing the audio and video information. Also, period information can be automatically controlled according to the transmission channels, so that the time difference created between the transmitter and the receiver can be controlled properly.

What is claimed is:

1. An audio and video multiplexed transmitter for coding and then transmitting audio and video information, comprising:
    an audio analog-to-digital converter for converting an audio signal into a digital audio signal periodically according to a predetermined clock frequency;
    an audio encoder for coding the digital audio signal;
    a video analog-to-digital converter for converting a video signal into a digital video signal periodically according to said predetermined clock frequency;
    a video encoder for coding the digital video signal;
    a coding controller for providing control data corresponding to said predetermined clock frequency to the audio encoder and the video encoder;
    a timer for outputting time data representing said predetermined clock frequency to the audio analog-to-digital converter, the video analog-to-digital converter and the coding controller; and
    a multiplexer for multiplexing the coded audio and video signals, according to the control data of the coding controller, to output a data stream.

2. The audio and video multiplexed transmitter of claim 1, further comprising an encapsulator for converting the data stream output by the multiplexer into a data frame, according to the characteristics of a transmission medium.

3. The audio and video multiplexed transmitter of claim 2, wherein the data stream includes a transport header arranged at a leading end, only in the initial multiplexing stage, having start information and period information, tick information of a specific bit stream for transmitting clock frequency information, a T-header as audio and video header information encoded periodically according to said predetermined clock frequency according to the tick information, and coded audio and video information of said coded audio and video signals, wherein said T-header includes data identification information, alignment and data length information, and end of stream data.

4. The audio and video multiplexed transmitter of claim 3, wherein the data frame includes a frame header as header information for transmission, and data information having the data stream.

5. An audio and video multiplexed receiver for receiving coded audio and video information for demultiplexing and decoding, comprising:
    a demultiplexer for demultiplexing a received data stream to separate digital audio and video signals;
    an audio decoder for decoding the digital audio signal;
    a video decoder for decoding the digital video signal;
    an audio digital-to-analog converter for converting the decoded digital audio signal into an analog audio signal periodically according to a predetermined clock frequency;
    a video digital-to-analog converter for converting the decoded digital video signal into an analog video signal periodically according to said predetermined clock frequency;
    a decoding controller for providing control data, corresponding to said predetermined clock frequency, to the audio decoder and the video decoder; and
    a timer for outputting time data representing said predetermined clock frequency to the audio digital-to-analog converter, the video digital-to-analog converter and the decoding controller.

6. The audio and video multiplexed receiver of claim 5, further comprising a decapsulator for converting a data frame, transmitted from an encapsulator of a transmitter or a transmission medium, into a data stream, according to the characteristics of the transmission medium.

7. The audio and video multiplexed receiver of claim 6, wherein the data stream includes a transport header arranged at a leading end, only in the initial multiplexing stage, having start information and period information, tick information of a specific bit stream for transmitting clock frequency information, a T-header as audio and video header information encoded periodically according to said predetermined clock frequency according to the tick information, and coded audio and video information of said coded audio and video signals, wherein said T-header includes data identification information, alignment and data length information, and end of stream data.

8. The audio and video multiplexed receiver of claim 7, wherein the data frame includes a frame header as header information for transmission, and data information having the data stream.

9. An audio and video multiplexed transmission system for coding then transmitting audio and video information through a coding, and for receiving the coded audio and video information for decoding, comprising:
    a transmitter; and
    a receiver,
    wherein the transmitter comprises:
        an audio analog-to-digital converter for converting an audio signal into a digital audio signal periodically according to a predetermined clock frequency;

an audio encoder for coding the digital audio signal;

a video analog-to-digital converter for converting a video signal into a digital video signal periodically according to said predetermined clock frequency;

a video encoder for coding the digital video signal;

a coding controller for providing control data corresponding to said predetermined clock frequency to the audio encoder and the video encoder;

a first timer for providing first time data representing said predetermined clock frequency to the audio analog-to-digital converter, the video analog-to-digital converter and the coding controller; and a multiplexer for multiplexing the coded audio and video signals according to the control data from the coding controller to output a data stream; and the receiver comprises:

a demultiplexer for demultiplexing the input data stream to separate digital audio and video signals;

an audio decoder for decoding the digital audio signal;

an audio digital-to-analog converter for converting the decoded audio signal into an analog audio signal periodically according to said predetermined clock frequency;

a video decoder for decoding the digital video signal;

a video digital-to-analog converter for converting the decoded video signal into an analog video signal periodically according to said predetermined clock frequency;

a decoding controller for providing control data corresponding to said predetermined clock frequency to the audio decoder and the video decoder; and a second timer for outputting second time data representing said predetermined clock frequency to the audio digital-to-analog converter, the video digital-to-analog converter and the decoding controller.

10. The audio and video multiplexed transmission system of claim 9, further comprising:

an encapsulator for converting the data stream continuously output by the multiplexer to a data frame, according to the characteristics of a transmission medium; and a decapsulator for converting the data frame input from the encapsulatorvia said transmission medium into said data stream, according to the characteristics of the transmission medium.

11. The audio and video multiplexed transmission system of claim 10, wherein the data stream includes a transport header arranged at a leading end, only in the initial multiplexing stage, having start information and period information, tick information of a specific bit stream for transmitting clock frequency information, a T-header as audio and video header information encoded periodically according to said predetermined clock frequency according to the tick information, and coded audio and video information of said coded audio and video signals, wherein said T-header includes data identification information, alignment and data length information, and end of stream data.

12. The audio and video multiplexed transmission system of claim 11, wherein the data frame includes a frame header as header information for transmission, and data information having the data stream.

13. The audio and video multiplexed transmission system of claim 11, wherein said second timer is responsive to said tick information for outputting said second time data.

14. The audio and video multiplexed transmission system of claim 11, wherein said second timer is responsive to said tick information for synchronizing said second time data to said first time data.

* * * * *